US006907270B1

(12) United States Patent
Blanz

(10) Patent No.: US 6,907,270 B1
(45) Date of Patent: Jun. 14, 2005

(54) METHOD AND APPARATUS FOR REDUCED RANK CHANNEL ESTIMATION IN A COMMUNICATIONS SYSTEM

(75) Inventor: Josef J. Blanz, Denver, CO (US)

(73) Assignee: QUALCOMM Inc., San Diego, CA (US)

(*) Notice: Subject to any disclaimer, the term of this patent is extended or adjusted under 35 U.S.C. 154(b) by 408 days.

(21) Appl. No.: 09/694,432

(22) Filed: Oct. 23, 2000

(51) Int. Cl.[7] .............................................. H04M 1/00
(52) U.S. Cl. .................. 455/562.1; 455/455; 455/67.1; 320/310; 320/242; 320/281; 320/329; 342/455; 342/445; 342/412; 342/442; 342/434; 342/124; 342/282.1; 342/283
(58) Field of Search ............................... 455/562, 67.1; 342/360, 455, 445, 412, 442, 434, 124, 222.1, 383; 320/210, 242, 281, 329; 375/341

(56) References Cited

U.S. PATENT DOCUMENTS 6,232,918 B1 * 5/2001 Wax et al. .................. 342/360
6,347,234 B1 * 2/2002 Scherzer .................. 455/562.1

FOREIGN PATENT DOCUMENTS

| EP | 0866568 A1 | 9/1998 |
|---|---|---|
| WO | 98/09381 | 3/1998 |
| WO | 98/43106 | 10/1998 |
| WO | 9843459 | 10/1998 |

OTHER PUBLICATIONS

J. Blanz, et al. "Smart Antennas for Combined DOA and Joint Channel Estimation in Time–Slotted CDMA Mobile Radio Systems With Joint Detection," IEEE Transactions on Vehicular Technology, vol. 49, No. 2, Mar. 2000. (pp. 293–306).
A. Papathanassiou, et al., "Smart Antennas With Two–Dimensional Array Configurations for Performance Enhancement of a Joint Detection CDMA Mobile Radio System," Wireless Personal Communications, Kluwer Academic Publishers (1999). (pp. 89–107).
Jian–Guo Wang, et al., "An Adaptive Antenna Array With Parallel Beamformers for Indoor Radio Channel Enhancement," IEEE 47th Vehicular Technology Conference 1997.
Erik Lindskog, et al., "Reduced Rank Channel Estimation, Signal and System," Uppsala University, Sweden; VTC'99, Houston, TX, USA, May 17–21, 1998.
Erik Lindskog,"Indirect Spatio–Temporal Equalization and Adaptive Interference Cancellation for Multipath Environments in Mobile Radio Applications," System and Control Group, Uppsala Univeristy, Sweden; IEEE/IEE Workshop on Signal Processing Methods in Multipath Environments, Glasgow, UK, Apr. 20–21, 1995.
Erik Lindskog, et al., "Multi–User Channel Estimation Exploiting Pulse Shaping Information," Signals and System, Uppsala University, Sweden; EUSIPCO '98, Rhodes, Greece, Sep. 8–11, 1998.

(Continued)

Primary Examiner—David Hudspeth
Assistant Examiner—David Nguyen
(74) Attorney, Agent, or Firm—Philip R. Wadsworth; Sandra L. Godsey

(57) ABSTRACT

A method and apparatus for estimating a communication channel in a wireless communication system having multiple transmitter antennas using reduced rank estimation. The method exploits redundant and/or a priori knowledge within a system to simplify the estimation calculations. In one embodiment, a covariance matrix is calculated and analyzed to determine if the channel parameters may be reduced for channel estimation. If not, all parameters are used, otherwise a reduced rank matrix is used for the calculation.

17 Claims, 7 Drawing Sheets

OTHER PUBLICATIONS

E. Lindskog et al. "Reduced Rank Channel Estimation" 1999 IEEE $49^{th}$ Vehicular Technology Conference. Houston, TX, May 16–20, 1999, IEEE Vehicular Technology Conference, New York, NY: IEEE, US, vol. 2 Conference 49, May 16, 1999, pp. 1126–1130.

D. Giancola et al. "Variable Rank Receiver Structures for Low–Rank Space–Time Channels" 1999 IEEE $49^{th}$ . Vehicular Technology Conference. Houston, TX, May 16–20, 1999, IEEE Vehicular Technology Conference, New York, NY: IEEE, US, vol. 1, Conference 49, May 16, 1999, pp. 65–69.

* cited by examiner

METHOD AND APPARATUS FOR REDUCED RANK CHANNEL ESTIMATION IN A COMMUNICATIONS SYSTEM

FIELD

The present invention relates to wireless communications. More particularly, the present invention relates to a novel and improved method of reduced rank channel estimation in a communications system.

BACKGROUND

To improve the quality of wireless transmissions, communication systems often employ multiple radiating antenna elements at the transmitter to communicate information to a receiver. The receiver may then have one or more receiver antennas. Multiple antennas are desirable, as wireless communication systems tend to be interference-limited, and the use of multiple antenna elements reduces inter-symbol and co-channel interference introduced during modulation and transmission of radio signals, enhancing the quality of communications. The modeling, and thus design, of such a system, involves estimating several parameters of the space-time channel or link between the transmitter and receiver.

The number of estimated channel parameters per transmit-receiver antenna pair is multiplied by the number of permutations of transmitter-receiver antenna pairs, creating increasingly complicated calculations and decreasing estimation quality. Therefore, it is desirable to have methods of channel estimation that use a reduced set of parameters. Similarly, there is a need for an improved method of channel estimation for radio communications systems having multiple transmitter antennas.

SUMMARY

The presently disclosed embodiments are directed to a novel and improved method and apparatus for estimating channel parameters in a communication link in a wireless communication system having multiple transmitter antennas using a reduced rank estimation method. Each path from a transmitter antenna to the receiver constitutes a channel within the link. The number of channels, therefore, increases with the numbers of transmitter antennas and receiver antennas. The method exploits redundant and/or a priori knowledge within a system to simplify the channel model used as a basis for the estimation calculations and to improve the estimation quality. In one embodiment, a covariance matrix is calculated and analyzed to determine if the number of channel parameters may be reduced for channel estimation. If not, all parameters are estimated, otherwise a reduced rank channel model is used for the calculation of channel parameter estimates.

In one aspect, a method for modeling a link in a wireless communication system, the system having a transmitter having N antennas and a receiver having M antennas, each path from one of the N transmitter antennas to the M receiver antennas comprising a channel, includes determining a matrix describing parametric relations of the link; ranking the matrix; determining if the rank is less than N×M; if the rank is less then N×M performing an extraction of a subspace of the matrix; deriving channel impulse responses for each channel based on the extracted subspace of the matrix; and demodulating a received signal using the channel impulse responses. The matrix may be a covariance matrix describing the link, wherein the covariance matrix represents a plurality of impulse responses between the transmitter and the receiver. Alternatively, the matrix may be a sample matrix describing the link.

Further, determining the matrix may include estimating a plurality of parameters describing at least one channel. The parameters may include a distance between transmitter antennas. In one embodiment, the parameters include a transmittal angle with respect to a configuration of the transmitter antennas. In an alternate embodiment, the matrix describes parametric relations of the link in the frequency domain.

Further, ranking the matrix may include determining an eigenvalue for the matrix. In one embodiment, if the rank is equal to (N×M) a set of correlated impulse responses is applied for demodulating. In one aspect, a wireless apparatus is operative to model a link in a wireless communication system by determining a matrix describing parametric relations of the link; ranking the matrix; determining if the rank is less than N×M; if the rank is less then N×M performing an extraction of a subspace of the matrix; deriving channel impulse responses for each channel based on the extracted subspace of the matrix; and demodulating a received signal using the channel impulse responses.

In another embodiment, a wireless communication apparatus includes a correlator operative to estimate a covariance matrix representing a link with a transmitter based on signals received from the transmitter; a rank analysis unit coupled to the correlator and operative to estimate a rank of the covariance matrix; and a channel estimation unit coupled to the rank analysis unit and operative to generate a reduced rank channel estimate. The covariance matrix may represent a plurality of impulse responses between the apparatus and the transmitter. In one embodiment, the rank analysis unit is operative to determine an eigenvalue corresponding to the covariance matrix and is operative to compare the estimated rank of the covariance matrix to a predetermined full value.

In still another embodiment, a method for estimating a link in a wireless communication system includes estimating a covariance matrix for the link; determining if the rank of the covariance matrix is reducible; reducing the rank of the covariance matrix; and estimating a set of impulse responses for the link using the reduced rank covariance matrix. Additionally, the method may include determining a correlation of the channel; ranking the covariance matrix; and performing an extraction of a reduced rank matrix out of the covariance matrix.

In one embodiment, a wireless communication apparatus is operative within a wireless communication system having a transmitter having N antennas and a receiver having M antennas, each path from one of the N transmitter antennas to the M receiver antennas comprising a channel. The apparatus includes a first set of computer readable instructions operative to determine a covariance matrix describing the link; a second set of computer readable instructions operative to rank the covariance matrix; a third set of computer readable instructions operative to determine if the rank is less than N×M; a fourth set of computer readable instructions operative to perform an extraction of a reduced rank matrix out of the covariance matrix if the rank is less then N×M; a fifth set of computer readable instructions operative to derive channel impulse responses for each channel based on the reduced rank covariance matrix; a sixth set of computer readable instructions operative to demodulate a received signal using the channel impulse responses. The apparatus may further include an equalizer operative in response to the sixth set of computer readable instructions, wherein a configuration of the equalizer is determined by the rank of the covariance matrix. In one embodiment, the apparatus includes a seventh set of computer readable instructions operative to derive a correlated channel impulse response.

In still another aspect, a wireless communication apparatus includes a channel estimation means operative to estimate a covariance matrix representing a link with a transmitter based on signals received from the transmitter; a rank analysis unit coupled to the correlator and operative to estimate the rank of the covariance matrix; and a channel estimation means coupled to the rank analysis unit and operative to generate a reduced rank channel estimate.

Further in another aspect, a wireless communication apparatus includes a correlator operative to estimate a covariance matrix representing a link with a transmitter based on signals received from the transmitter; a rank analysis unit coupled to the correlator and operative to estimate the rank of the covariance matrix; and a channel estimation means coupled to the rank analysis unit and operative to generate a reduced rank channel estimate.

In yet another aspect, a method for estimating a link in a wireless communication system includes estimating a covariance matrix for the link; determining if the rank of the covariance matrix is reducible; reducing the rank of the covariance matrix; and estimating a set of impulse responses for the link using the reduced rank covariance matrix. The method may further include determining a correlation of the channel; ranking the covariance matrix; and performing an extraction of a reduced rank matrix out of the covariance matrix;

In another embodiment, a wireless apparatus includes channel estimation means operative to determine significant delays and determine a set of estimates of full dimension channel parameters associated with the significant delays, wherein each one of the set of estimates corresponds to an instance in time; eigenvalue computation means operative to determine eigenvalues of the set of estimates of the full dimension channel parameters and find any dominant eigenvalues; and channel estimation means operative to determine a set of reduced rank channel parameter estimates in response to the dominant eigenvalues. Further, the apparatus may include eigenvector computation means operative to determine at least one eigenvector associated with one of the dominant eigenvalues of the set of estimates; wherein the channel estimation means uses the at least one eigenvector to project the set of estimates of the full dimension channel parameters onto the subspace spanned by the at least one eigenvector.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Multiple radiating antennas may be used to improve transmission quality in a wireless communications system. In the design of third generation mobile radio systems, for example, various transmitter antenna diversity techniques are presented. Multiple transmitter antennas may be used to communicate information to a receiver using a single or multiple receiver antenna(s). Multiple antenna systems offer an improvement in quality. However, the improvement is dependent on the accuracy of the channel model used in the receiver to demodulate the transmitted information. Modeling of the transmission channel uses parameter estimates and determines an effective channel impulse response for the channel. When multiple antennas are used, the modeling involves estimates of each transmission channel for all transmitter-receiver antenna pairs.

The transmission channel from transmitter to receiver is a space-time channel described generally by at least one impulse response. Often there is little change in the channel parameters from one channel to another, such as where the channel impulse responses differ only in phase. In such a case, it may not be necessary to derive estimates of impulse responses independently for each channel, but rather some information may be reused. When channels are correlated, a reduced rank representation of the channels may be used. Reduced rank refers to the reduced number of completely uncorrelated channels used to describe the link between transmitter and receiver. One way to observe this reduced rank is the rank reduction of the channel covariance matrix used to describe the mutual statistical dependencies of the different channel impulse responses. Note that the reduced rank can also be realized by other parameter measures. For example, in one embodiment a sample matrix is formed of columns comprising samples of channel impulse response estimates over time, wherein the reduced row rank of such a sample matrix is applied as described herein. A reduction in rank may result in a less complex filter or demodulator, i.e., reduces the number of filters and/or filter elements and/or demodulation units used in the receiver. Furthermore, the reduction of the number of estimated parameters used to characterize the channel leads to improved accuracy of the channel model.

Figure 1:
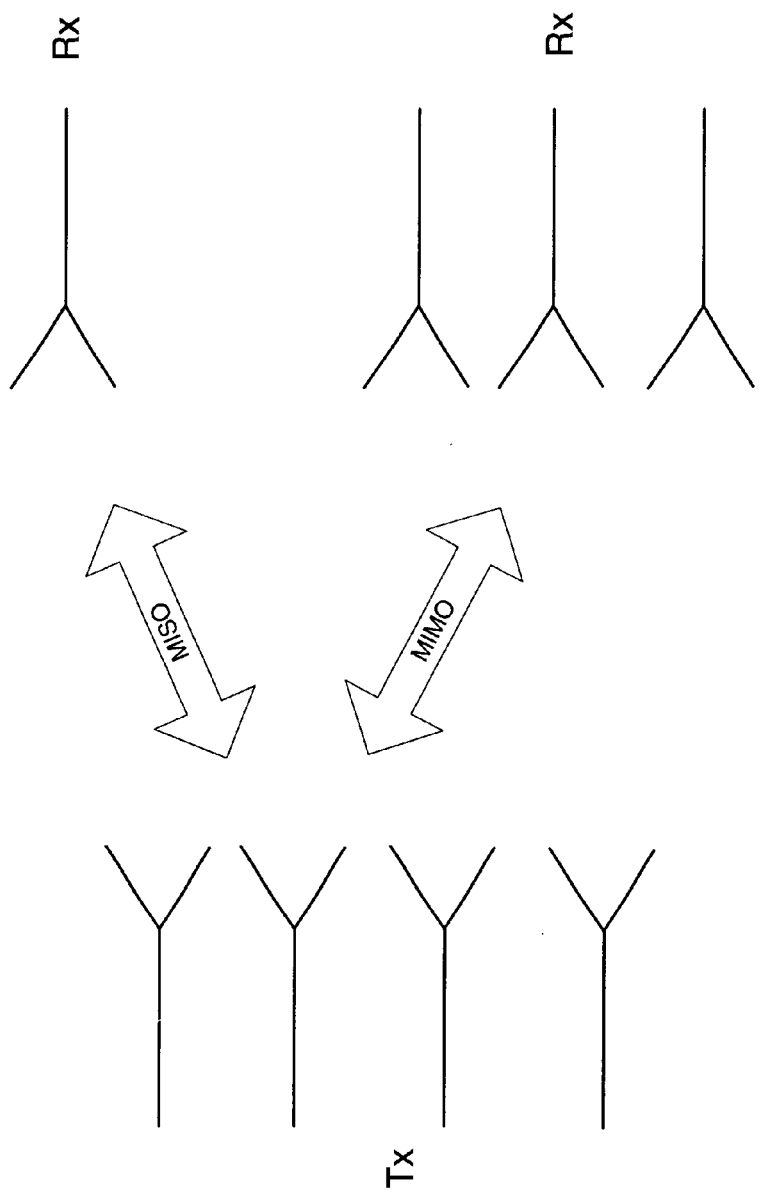
FIG. 1 illustrates configurations of wireless communication systems including multiple transmitter antennas.
Figure 2:
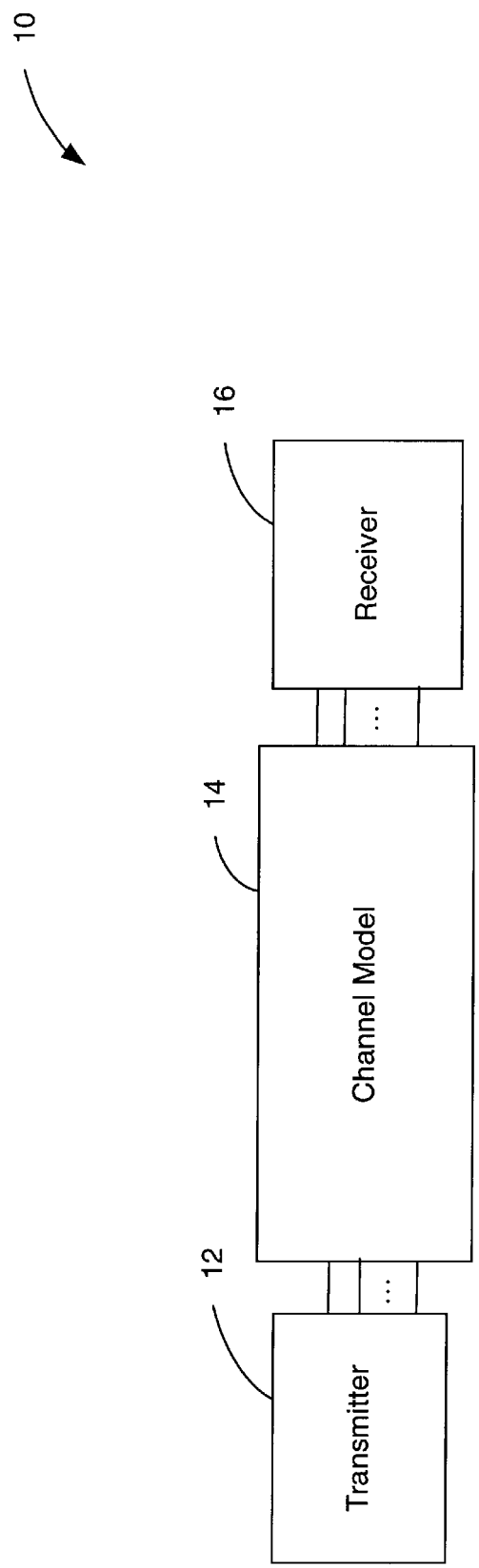
FIG. 2 illustrates a model of a wireless communication system according to one embodiment.

FIG. 1 illustrates configurations for wireless communication systems having multiple transmitter Tx antennas. Two paths are illustrated: a first multiple input, multiple output (MIMO) and a second path multiple input single output (MISO). The MISO configuration places multiple Tx antennas in communication with a single Rx antenna. The MIMO configuration extends this to multiple Rx antennas. The channel model for one of the systems of FIG. 1 is illustrated in FIG. 2, in accordance with one embodiment, specifically, for a wireless system employing coherent demodulation, having a link between a transmitter and a receiver, wherein at least the transmitter employs multiple antennas. The wireless communication system 10 includes a transmitter 12 and receiver 16 that communicate via an air interface. A channel model 14 represents the channels for antenna pairs between transmitter 12 and receiver 16. Channel model 14 considers the channels within a link, such as the MISO link of FIG. 1.

Continuing with FIG. 2, let $N_{Tx}$ be the number of antennas used at the transmitter 12 and $N_{Rx}$ the number at the receiver 16, respectively. In general, for each significant propagation delay between transmitter and receiver, $(N_{Tx} \cdot N_{Rx})$ transmission channels exist for the pair, wherein for a significant propagation delay the received signals resemble the known transmitted signals with high certainty. In other words, define $N_E$ as the number of significant propagation delays, also referred to as echoes. The $(N_{Tx} \cdot N_{Rx} \cdot N_E)$ channel impulse response samples are then estimated to perform coherent demodulation. When the channels are uncorrelated, the $(N_{Tx} \cdot N_{Rx} \cdot N_E)$ channel impulse response samples are modeled as completely uncorrelated random processes and the estimates of these channel impulse response samples may be derived independently without loss of demodulation performance. However, if the $(N_{Tx} \cdot N_{Rx} \cdot N_E)$ channel impulse response samples are not uncorrelated random processes the $(N_{Tx} \cdot N_{Rx} \cdot N_E)$ channel impulse response samples may be modeled as a linear combination of a smaller number $N_{Ch}$ of channel impulse response samples, wherein $N_{Ch} < (N_{Tx} \cdot N_{Rx} \cdot N_E)$. Such cases include, but are not limited to, minimal angular spread at the transmitter and/or receiver in the effective channels due to propagation conditions. If $N_{Ch}$ is known, or estimated, and the linear transformation of the $N_{Ch}$ channel impulse response samples are resolved into the $(N_{Tx} \cdot N_{Rx} \cdot N_E)$ channel impulse response samples, then modeling may be accomplished with the $N_{Ch}$ channel impulse response sample estimations. This reduces the number of parameters to be estimated while increasing estimation quality, yielding an increase in the demodulation performance. Even if the exact representation of the linear transformation of the $N_{Ch}$ channel impulse response samples into the corresponding $(N_{Tx} \cdot N_{Rx} \cdot N_E)$ channel impulse response samples is not known, the modeling may still be accomplished with $N_{Ch}$ channel impulse response sample estimations if the subspace spanned by vectors of this linear transformation is known or can be estimated.

This principle is referred to as "Reduced Rank Channel Estimation." The transformation of the $N_{Ch}$ uncorrelated channel impulse responses into the $(N_{Tx} \cdot N_{Rx} \cdot N_E)$ correlated channel impulse responses can depend on factors including, but not limited to, the antenna configuration, antenna patterns, polarization characteristics, propagation conditions and more. In some cases the transformation might be known a priori, in other cases it can be derived or estimated, for example by angle-of-arrival estimation. The subspace spanned by the linear transformation of the $N_{Ch}$ channel impulse response samples into the corresponding $(N_{Tx} \cdot N_{Rx} \cdot N_E)$ channel impulse response samples can be determined by estimating the rank and the eigenvectors of the $(N_{Tx} \cdot N_{Rx} \cdot N_E)$-dimensional covariance matrix of the $(N_{Tx} \cdot N_{Rx} \cdot N_E)$ channel impulse response samples. This subspace can also be determined by using a singular value decomposition of a matrix holding columns with all $(N_{Tx} \cdot N_{Rx} \cdot N_E)$ channel impulse response sample estimates for different points in time. Note that if the channel impulse response samples are corrupted by a known correlation noise, and if the noise correlation can be estimated, the $(N_{Tx} \cdot N_{Rx} \cdot N_E)$ channel impulse response samples may be filtered by a noise de-correlation filter first.

In one embodiment, the rank reducing transformation is known a priori or is estimated. In other words, the mapping of the $N_{Ch}$ channels onto the $(N_{Tx} \cdot N_{Rx})$ channels is ascertainable. The reduced rank channel is then estimated using the ascertained transformation. When desired, an equivalent full dimensional channel model may then be derived from the reduced rank estimate by transforming the reduced rank estimate back to the larger dimension.

In an alternate embodiment, the rank reducing transformation is not directly known, but the subspace spanned by the transformation may be extracted from the dominant eigenvectors of the channel covariance matrix. Note that the subspace may be referred to as the signal subspace or the channel subspace. The process involves first estimating a channel covariance matrix and finding the dominant eigenvalues. By determining the associated eigenvectors which span the channel subspace, the process projects the conventional channel estimate into the channel subspace, yielding a reduced rank channel model with reduced estimation errors. If desired, the reduced rank model may be transformed back into an equivalent full dimension channel model.

Figures 3, 4:
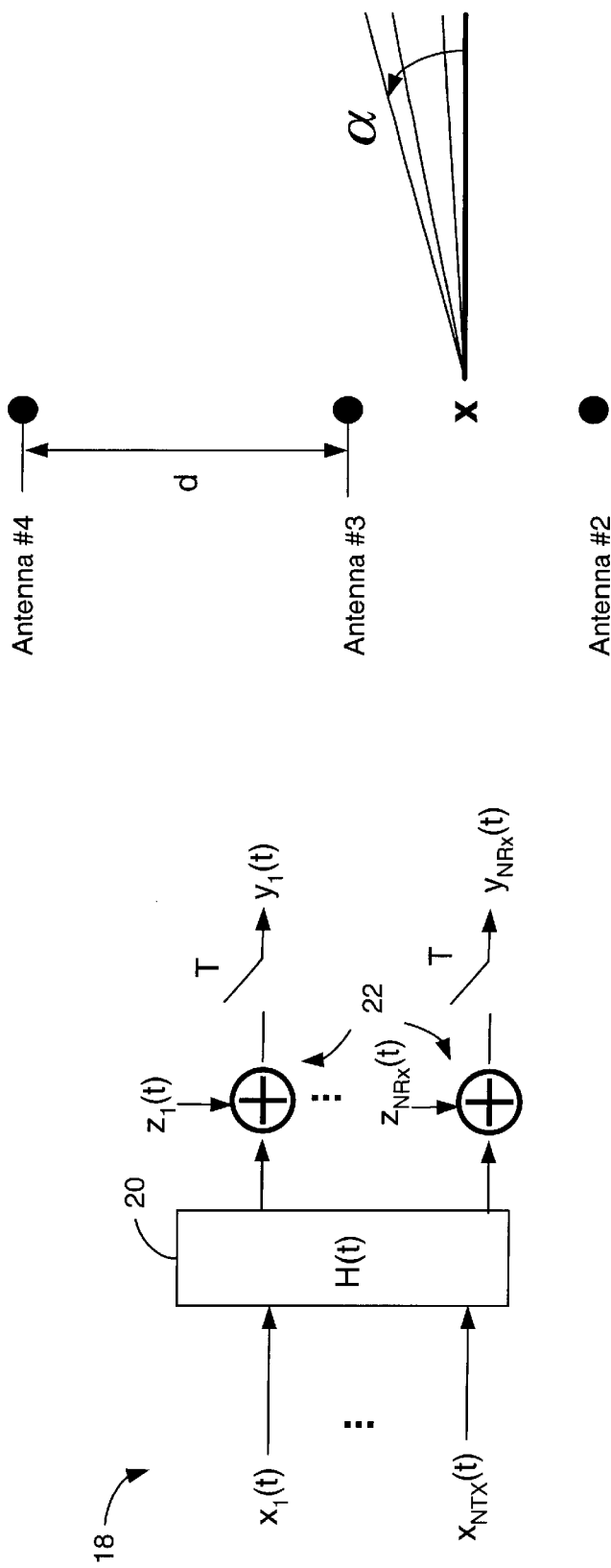
FIG. 3 illustrates a model of a channel between transmitter and receiver in a wireless communication system.
FIG. 4 illustrates the physical layout of antennas in a transmitter of a wireless communication system.

FIG. 3 illustrates a model 18 of a MIMO channel for continuous time having a linear MIMO filter 20 with $N_{Tx}$ inputs and $N_{Rx}$ outputs. The linear MIMO filter 20 is defined by the $(N_{Tx} \times N_{Rx})$ matrix H(t) comprising of linear functions $h_{ij}(t)$, $i=1 \ldots N_{Tx}$, $j=1 \ldots N_{Rx}$. Generally, $h_{ij}(t)$, $i=1 \ldots N_{Tx}$, $j=1 \ldots N_{Rx}$ are unknown linear functions. The linear MIMO filter 20 represents the $(N_{Tx} \cdot N_{Rx})$ radio channels through which the $N_{Tx}$ transmit signals pass to the $N_{Rx}$ receiver antennas. These radio channels are characterized by their channel impulse responses $h_{ij}(t)$, $i=1 \ldots N_{Tx}$, $j=1 \ldots N_{Rx}$. The input signal to the model, $\vec{x}(t)$, is a $(N_{Tx} \times 1)$ column vector representing the $N_{Tx}$ band-limited transmit signals, and the output signal from the model, $\vec{y}(t)$, is a $(N_{Rx} \times 1)$ column vector, sampled at $t=T, 2T \ldots$, as illustrated by switch T, where the bandwidth of the transmitted signals is less or equal to 1/T. The received signals contain additive perturbation signals represented by the $(N_{Rx} \times 1)$ column vector $\vec{z}(t)$, introduced due to noise or co-channel interference. The additive perturbation signals are added at summation nodes 22. The relation between the input signals $\vec{x}(t)$, the channels H(t), the perturbation $\vec{z}(t)$ and the output signals $\vec{y}(t)$ is given by $$\vec{y}(t) = H^T(t) * \vec{x}(t) + \vec{z}(t), \quad (1)$$

where * denotes the convolution.

FIG. 4 illustrates the physical configuration of antennas at the transmitter of an exemplary embodiment modeled as in FIG. 2. A reduced rank method is applied to estimate the link represented by channel model 14, having a transmitter 12 configured with the four (4) antennas, each spaced at a distance "d." The specifics of the configuration and model are discussed hereinbelow. Note that the estimation procedure is performed at the receiver 16. A reference direction is given by the horizontal line. Angles of transmission are measured with respect to this reference. The angle "a" corresponds to an angle of a propagation path with respect to the reference within a 2-D plane as illustrated. A range of angles with respect to the reference is also illustrated. The following method is used at the transmitter 12 in system 10 to estimate the link.

Figure 5:
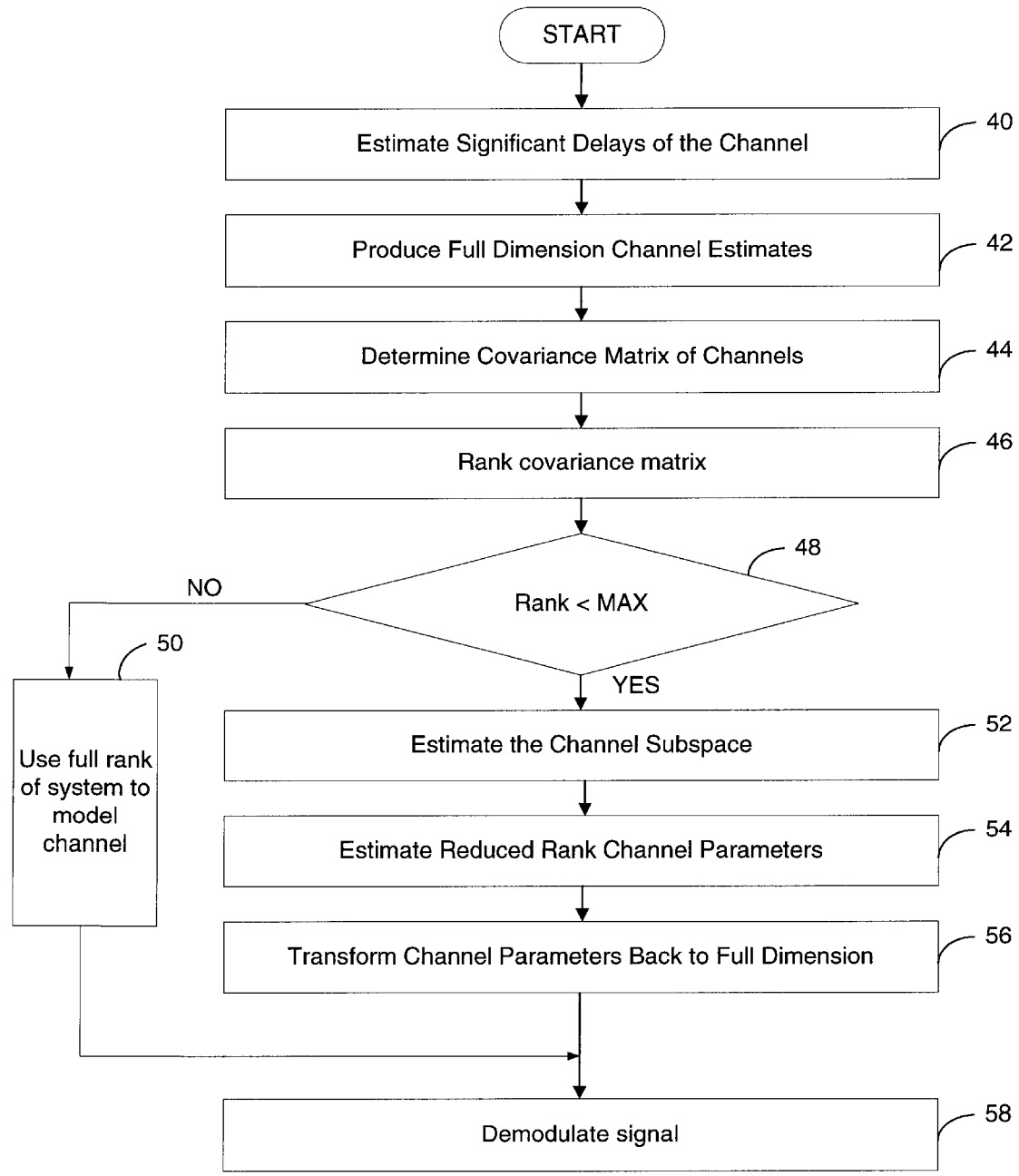
FIG. 5 illustrates a flow diagram of a method of reduced rank channel estimation for a wireless communication system according to one embodiment.

FIG. 5 illustrates a flow diagram of an exemplary method of channel estimation used to process signals in a receiver unit in accordance with one embodiment. Process flow begins by searching for significant propagation delays in the channel, i.e. searching for significant echoes at step 40. In one embodiment the process involves a sliding correlation of the received signals with known transmitted signals or known components of the transmitted signals. Correlation refers to the degree with which the received signals are related to the known transmitted signals, wherein a perfect correlation proves a relationship between the signals with high confidence. For time-shifted signals, wherein sliding delays are used to shift the received signals in time, a resultant sliding correlation provides the degree of certainty with which the time-shifted signals resemble the known transmitted signals. Thus in the wireless system context, sliding correlation relates to the synchronization of known signals transmitted by the Tx antennas with time-shifted versions of the received signals. The exemplary embodiment of reduced rank channel estimation uses sliding correlation of the received signals with known transmitted signals to estimate the number $N_E$ and the values $\tau_1, \tau_2 \ldots, \tau_{N_E}$ of significant propagation delays, i.e. delays for which the received signals shifted back by these delays in time resemble the known transmitted signals with high certainty. The procedure of sliding correlation in order to find significant propagation delays is also known as "searching" in CDMA systems.

The method then estimates parameters for multiple observable channels between the $N_{Tx}$ transmitter antennas and the $N_{Rx}$ receiver antennas at step 42. The channels are radio network connection pairs coupling at least a portion of the $N_{Tx}$ transmitter antennas to at least a portion of the $N_{Rx}$ receiver antennas. In the exemplary embodiment, there is a connection between each transmitter 12 antenna and each receiver 16 antenna, resulting in $(N_{Tx} \cdot N_{Rx})$ channels. The parameters describing the multiple channels are those characteristics that impact the impulse responses of the channels. Assuming that $N_E$ significant propagation delays (echoes) exist between transmitter and receiver, $(N_{Tx} \cdot N_{Rx} \cdot N_E)$ complex samples of the $(N_{Tx} \cdot N_{Rx})$ channel impulse responses could be used as a set of parameters describing the multiple channels. This set of parameters is denoted by a $((N_{Tx} \cdot N_{Rx} \cdot N_E) \times 1)$ vector termed $\vec{h}$ herein. The relation between $\vec{x}(t)$, $\vec{h}$, $\vec{z}(t)$, and $\vec{y}(t)$ is developed hereinbelow.

With $\tau_1, \tau_2, \ldots, \tau_{N_E}$ being the significant propagation delays between transmitter and receiver, the model described by (1) can be expressed as $$\vec{y}(t) = \sum_{e=1}^{N_E} H^T(\tau_e) \cdot \vec{x}(t - \tau_e) + \vec{z}(t). \quad (2)$$

This can be transformed into $$\vec{y}(t) = [(I^{(N_{Rx})} \otimes \vec{x}^T(t-\tau_1))(I^{(N_{Rx})} \otimes \vec{x}^T(t-\tau_2)) \ldots (I^{(N_{Rx})} \otimes \vec{x}^T(t-\tau_{N_E}))] \cdot \vec{h} + \vec{z}(t), \quad (3)$$

where $\otimes$ denotes the Kronecker tensor product, $I^{(N_{Rx})}$ is a $(N_{Rx} \times N_{Rx})$ identity matrix, and the vector $\vec{h}$ is obtained from the matrix H(t) such that [[$\vec{h}$]]

$$\vec{h} = [\vec{h}_{total}(\tau_1) \vec{h}_{total}(\tau_2) \ldots \vec{h}_{total}^T(\tau_{N_E})]^T, \quad (4)$$

$$\vec{h}_{total}(\tau_e) = vect\{H(\tau_e)\}, e=1 \ldots N_E, \quad (5)$$

hold. The $((N_{Tx} \cdot N_{Rx}) \times 1)$ vector $\vec{h}_{total}(\tau_e)$ is consisting of the elements of the matrix H(t) sampled at $\tau_e$ with all columns of $H(\tau_e)$ stacked on top of each other in the vector $\vec{h}_{total}(\tau_e)$, which is denoted by the operator $vect\{H(\tau_e)\}$ in (5), i.e. $\vec{h}_{total}(\tau_e)$ is given by $$\vec{h}_{total}(\tau_e) = \begin{bmatrix} [h_{11}(\tau_e) h_{21}(\tau_e) \ldots h_{N_{Tx}1}(\tau_e)]^T \\ [h_{12}(\tau_e) h_{22}(\tau_e) \ldots h_{N_{Tx}2}(\tau_e)]^T \\ \vdots \\ [h_{1N_{Rx}}(\tau_e) h_{21N_{Rx}}(\tau_e) \ldots h_{N_{Tx}N_{Rx}}(\tau_e)]^T \end{bmatrix}^T. \quad (6)$$

Since the output signals $\vec{y}(t)$ are sampled at a sampling rate of 1/T, vectors containing the discrete time samples can represent segments of a finite duration of the continuous time signals. For the sake of simplicity, the received signals $\vec{y}(t)$ are described herein by a discrete time representation over a finite duration of time t=0, T, ..., $(N_T-1)T$, where $N_T$ is the number of samples taken over time. Therefore, the following abbreviations are used. Each discrete time transmitted signal at antenna n delayed by $\tau$ is given by a vector $$\vec{s}^{(n)}(\tau) = [x_n(0-\tau) x_n(T-\tau) \ldots x_n((N_T-1)T-\tau)]^T, n=1 \ldots N_{Tx}. \quad (7)$$

Wherein the matrix describing all of the discrete time transmitted signals delayed by $\tau$ is given as $$S(\tau) = [\vec{s}^{(1)}(\tau) \vec{s}^{(2)}(\tau) \ldots \vec{s}^{(N_{Tx})}(\tau)] \quad (8)$$

The matrix A describes all discrete time transmit signals having significant delays.

$$A = [(I^{(N_{Rx})} \otimes S(\tau_1))(I^{(N_{Rx})} \otimes S(\tau_{N_E})) \ldots (I^{(N_{Rx})} \otimes S(\tau_{N_E}))] \quad (9)$$

A vector describing each discrete time perturbation signal at antenna n is given as $$\vec{n}^{(n)} = [z_n(0) z_n(T) \ldots z_n((N_T-1)T)]^T, n=1 \ldots N_{Rx}. \quad (10)$$

and the vector of all the discrete time perturbation signals is given as $$\vec{n} = [\vec{n}^{(1)T} \vec{n}^{(2)T} \ldots \vec{n}^{(N_{Rx})T}]^T. \quad (11)$$

The vector of the discrete time received signal at antenna n is given as $$\vec{r}^{(n)} = [y_n(0) y_n(T) \ldots y_n((N_T-1)T)]^T, n=1 \ldots N_{Rx}. \quad (12)$$

and the vector of all discrete time received signals is given as $$\vec{r} = [\vec{r}^{(1)T} \vec{r}^{(2)T} \ldots \vec{r}^{(N_{Rx})T}]^T. \quad (13)$$

Using the above abbreviations, the discrete time output signals of the MIMO channel model 18 illustrated in FIG. 3 over a period of time from t=0,T ..., $(N_T-1)T$ may be reduced to the simple model $$\vec{r} = A \cdot \vec{h} + \vec{n}. \quad (14)$$

The second step in the flow diagram in FIG. 5 at step 42, is to repeatedly process estimates for a set of parameters characterizing the multiple channels between transmitter and receiver. For the above-described mathematical representation of the channel model, this may be equivalent to processing estimates $\hat{\vec{h}}^{(n)}$, n=1 ... $N_h$ of the vector $\vec{h}$ in (14) for $N_h$ different points in time. A conventional method uses the correlation of the received signals, shifted back in time by certain delays, with known transmitted signals, such as pilot signals specific to the transmitter antennas, or predetermined training sequences. As the significant propagation delays $\tau_1, \tau_2, \ldots, \tau_{N_E}$ are already determined in step 40, the exemplary embodiment of reduced rank channel estimation uses the correlation of known transmitted signals with versions of the received signals, shifted back in time by $\tau_1, \tau_2, \ldots, \tau_{N_E}$, to generate a channel model, such as channel model 14 of FIG. 2, characterized by the vector $\vec{h}$. If the noise vector $\vec{n}$ represents spatial and temporal white perturbation, wherein the noise covariance matrix is given as $R_n = <\vec{n} \cdot \vec{n}^H> = \sigma^2 \cdot I^{(N_{Rx} \cdot N_T)}$, and if the matrix A comprises of the a priori known signals, such as pilot symbols of a CDMA system, channel estimates obtained by correlation can be described by $$\hat{\vec{h}} = A^H \cdot \vec{r}. \tag{15}$$

If the noise vector n does not represent spatial and temporal white perturbation, the channel estimates obtained by correlation can be described by $$\hat{\vec{h}} = A^H R_n^{-1} \cdot \vec{r} = A^H R_n^{-1} A \cdot \vec{h} + A^H R_n^{-1} \vec{n}. \tag{16}$$

Note that $R_n$ might be known a priori or could be estimated from the received signals. The channel estimate of (16) contains a perturbation vector $A^H R_n^{-1} \vec{n}$ with a covariance matrix of $R_p = A^H R_n^{-1} A$. This covariance matrix is not diagonal in general, i.e., the components of the perturbation vector contained in $\hat{\vec{h}}$ are correlated in general. If $R_p$ is known or can be estimated, the components of the perturbation vector contained in $\hat{\vec{h}}$ could be de-correlated by transforming $\hat{\vec{h}}$ with $R_p^{-1/2}$. This will be assumed in what follows, wherein $$\hat{\vec{h}} = R_p^{-1/2} A^H R_n^{-1} \cdot \vec{r} \tag{17}$$

shall hold.

As illustrated in FIG. 5, a covariance matrix of the channel parameters is estimated at step 44. Covariance measures the variance of one random variable with respect to another. In this case, the covariance matrix describes the variance of the various channel parameters with respect to each other. According to the above-described mathematical representation of the channel model, step 44 corresponds to processing an estimate $\hat{R}_h$ of the channel covariance matrix $R_h = <\vec{h} \cdot \vec{h} H>$. Such an estimate may be given as $$\hat{R}_h = \frac{1}{N} \sum_{n=1}^{N_h} \hat{\vec{h}}^{(n)} \cdot \hat{\vec{h}}^{(n)H}. \tag{18}$$

If the MIMO channel has a reduced rank wherein $N_{Ch} < (N_{Tx} \cdot N_{Rx} \cdot N_E)$, i.e. the $(N_{Tx} \cdot N_{Rx} \cdot N_E)$ MIMO channel impulse response samples can be described as a linear combination of $N_{Ch}$ uncorrelated channel impulse response samples. The channel vector $\vec{h}$ can be modeled as a linear transformation of a channel vector $\vec{g}$ of reduced dimension, wherein $$\vec{h} = B \cdot \vec{g}, \tag{19}$$

and wherein B is a $((N_{Tx} \cdot N_{Rx} \cdot N_E) \times N_{Ch})$ matrix describing the linear transformation. As given hereinabove, the vector $\vec{g}$ is a $(N_{Ch} \times 1)$ vector with uncorrelated components, i.e. $R_g = <\vec{g} \cdot \vec{g}^H>$ is a diagonal $(N_{Ch} \times N_{Ch})$ matrix. In this case, the channel covariance matrix is given as $$R_h = B \cdot R \cdot B^H. \tag{20}$$

As a consequence, the rank of the channel covariance matrix $R_h$ is equal to $N_{Ch}$. Given (20), and assuming that correlation according to (17) is used to derive the channel impulse response estimates $\hat{\vec{h}}$, the covariance matrix of $\hat{\vec{h}}$ is given as $$R_{\hat{h}} = <\hat{\vec{h}} \cdot \hat{\vec{h}}> = R_p^{1/2H} B \cdot R_g \cdot B^H R_p^{1/2} + I^{(N_{Tx} \cdot N_{Rx} \cdot N_E)}. \tag{21}$$

Due to the reduced rank $N_{Ch}$ of $R_h$, the eigenvalue decomposition $$R_p^{1/2H} B \cdot R_g \cdot B^H R_p^{1/2} = R_p^{1/2H} R_h R_p^{1/2} = E \cdot \Lambda \cdot E^H, \tag{22}$$

yields only $N_{Ch}$ non-zero eigenvalues, where $\Lambda$ is a diagonal matrix containing the eigenvalues and E is a square matrix containing the eigenvectors of $R_p^{1/2H} B \cdot R_g \cdot B^H R_p^{1/2}$. With (21) and (22) the covariance matrix estimate $\hat{R}_h$ maybe expressed by $$\hat{R}_h = E \cdot (\Lambda + I^{(N_{Tx} \cdot N_{Rx} \cdot N_E)}) \cdot E^H, \tag{23}$$

i.e., $\hat{R}_h$ shares the eigenvectors with $R_p^{1/2H} \cdot B \cdot R_g \cdot B^H R_p^{1/2}$. Since $\Lambda$ is a diagonal matrix with only $N_{Ch}$ non-zero elements, $(N_{Tx} \cdot N_R \cdot N_E) - N_{Ch}$ eigenvalues of $\hat{R}_h$ are constant, and $N_{Ch}$ eigenvalues of $\hat{R}_h$ are larger than the former ones. These larger eigenvalues are termed dominant eigenvalues in the sequel. With a diagonal matrix $\Lambda_C$, containing all dominant eigenvalues of the estimated channel covariance matrix, the matrix $E_C$, containing the corresponding eigenvectors, and with the matrix $E_N$, containing the remaining eigenvectors, (23) becomes $$\hat{R}_h = E_C \cdot \Lambda_C \cdot E_C^H + E_N E_N^H. \tag{24}$$

Therefore, the matrix $E_C$ contains the eigenvectors spanning the channel or signal subspace.

The estimated covariance matrix $\hat{R}_h$ is then ranked at step 46, meaning that the number of dominant eigenvalues is estimated. The rank is compared to a maximum value "MAX" at step 48. MAX is equal to the total number of estimated channel parameters in the vector $\hat{\vec{h}}$. In other words, MAX is equal to $(N_{Tx} \cdot N_{Rx} \cdot N_E)$. As many of the mechanisms impacting correlation, such as the directionality of the propagation paths, do not change quickly over time, the correlation characteristics may be estimated by averaging over rather long time intervals in comparison to the inverse fading rate of the channel(s).

The rank of the covariance matrix determines whether the $(N_{Tx} \cdot N_{Rx} \cdot N_E)$ channel parameters describing the $(N_{Tx} \cdot N_{Rx})$ existing transmission channels can be modeled as a linear combination of a smaller number $N_{Ch}$ of equivalent uncorrelated channel parameters. If a reduced rank is available, the channel subspace $E_C$ of the estimated covariance matrix $\hat{R}_h$ is derived at step 52. Note that instead of using the estimated covariance matrix $\hat{R}_h$, the rank of $\hat{R}_h$ and the channel subspace $E_C$ can also be derived from the matrix of channel parameter estimates:

$$\hat{X}_h = [\hat{\vec{h}}^{(1)} \hat{\vec{h}}^{(1)} \ldots \hat{\vec{h}}^{N_h}], \tag{25}$$

by using singular value decomposition.

With the channel subspace $E_C$, reduced dimension channel parameter vectors are estimated at step 54, according to $$\hat{\vec{g}}^{(n)} = E_C^H \cdot \hat{\vec{h}}^{(n)}, \qquad (26)$$

effectively projecting the originally estimated channel parameters into the channel subspace. This projection into the channel subspace reduces the estimation error. If a reduced complexity demodulator is used in the receiver, which uses the reduced rank channel, i.e., takes only a reduced number of channel parameters into account for demodulation, the estimates of (26) may be directly used in the demodulator for coherent demodulation. In other words, processing would flow directly from step 54 to step 58, or at a minimum step 58 would used the reduced rank estimates.

If a conventional receiver, designed for the full rank channel model, is to be used, the estimates $\hat{\vec{g}}^{(n)}$ may be transformed back into the full dimensional space at step 56, according to $$\hat{\vec{h}}_{new}^{(n)} = R_p^{-1/2H} E_C \cdot \hat{\vec{h}}^{(n)}, \qquad (27)$$

wherein the factor $R_p^{-1/2H}$ is used to make the estimate unbiased. Note that the estimate of the channel subspace $E_C$ may be updated continuously by using a sliding time window for the estimates $\hat{R}_h$ or $\hat{X}_h$ respectively. This eliminates the delay of waiting for a new complete sample set, by using a portion of the previous sample set with incrementally time-shifted new values.

If rank reduction is not possible, processing continues to use the full rank of the system to model the channel at step 50. In this case the method estimates the $(N_{Tx} \cdot N_{Rx} \cdot N_E)$ channel parameters independently from each other. Once the system is modeled, signal demodulation continues at step 58.

The MISO path illustrated in FIG. 1 is provided as an exemplary embodiment. As illustrated, the transmitter, Tx, has four (4) radiating antennas ($N_{Tx}=4$) and the receiver, Rx, has one (1) antenna ($N_{Rx}=1$). For simplicity, several assumptions allow a straightforward analysis demonstrating the applicability of the exemplary embodiment to modeling a system as illustrated in FIG. 1. First, the example assumes that each Tx antenna transmits a pilot signal specific to that antenna, wherein the antenna-specific pilot signal is time-aligned and orthogonal to the pilot signals of the other Tx antennas.

Second, assume the channels are frequency non-selective fading channels, each made up of a large number, P, of radio network paths. The paths each have approximately a same run length and a same attenuation. The second assumption ensures that the relative propagation delay is smaller than the inverse of the transmission bandwidth. The propagation delay of two radio paths is typically due to differences in run length.

Third, the channel model is restricted to 2-D propagation, i.e. all effective radio paths are located in a 2-D plane. See FIG. 4. Additionally, the geometry of the effective radio paths at the transmitter is assumed to be time-invariant, wherein each path departure angle, measured with respect to a reference direction of Tx, are concentrated around an average angle, $\bar{\alpha}$. The radio path angles are Gaussian distributed having mean $\bar{\alpha}$ and a standard deviation $\sigma$. For one simulation, $\bar{\alpha}$ is selected randomly between −60 and +60 degrees. The standard deviation $\sigma$ is assumed to be square root of two degrees. Fourth, the arrival paths at Rx are assumed uniformly distributed between 0 and 360 degrees to consider local scattering. Fifth, no line of sight exists.

Sixth, assume a specific phase and Doppler shift for each path. The path-specific phase is selected randomly according to a uniform distribution between 0 and $2\pi$. Additionally, the path-specific phase is adjusted for each Tx antenna according to the geometrical antenna configuration, i.e., the antenna location with respect to a reference point. For phase adjustment, assume object scattering is considered in the far field. The channel-specific Doppler shifts are generated according to a uniform distribution of the angles of arrival paths at Rx, a carrier frequency and a predetermined Rx speed. In the exemplary embodiment, the carrier frequency is assumed to be 1.8 GHz and the receiver speed equal to 60 km/h yielding a maximum Doppler shift of 100 Hz. In the exemplary embodiment, each Tx antenna covers a 120-degree sector, with the antenna patterns all oriented towards $\alpha=0$.

Given the exemplary system as detailed, application of the process of FIG. 5 provides a channel model having a time variance according to the classic Doppler spectrum. It is possible to consider an antenna-specific radiation pattern. With this channel model, the channel impulse responses for the channels seen through the different transmitter antennas can be generated using the same set of radio paths, thus, introducing realistic correlation in the fading of the different channels.

On the receiving side of the air-interface, at the single antenna of Rx, the method derives an impulse response estimate for each of the four transmission channels, i.e., the four radio network connections between Tx antennas and the Rx antenna. The estimate is based on the a-priori knowledge of spreading codes used to generate the antenna-specific pilot signals associated with each Tx antenna.

Referring again to FIG. 4, in the geographical configuration of antennas at Tx., the antennas are positioned in a line having constant spacing d between neighboring antennas, wherein $d=\lambda$, i.e., antennas are spaced one wavelength apart. Note that Rx has a single omnidirectional antenna. A total number of effective radio paths is considered with P=50. Channel specific variables, $\alpha_p$, $f_p$, and $\Phi_p$, represent, respectively, the angle measured from the reference line, the Doppler shift and the phase. The equation describing the channel impulse response for a channel between Tx antenna n and the Rx antenna is given as $$h_n(t) = \frac{1}{\sqrt{P}} \sum_{p=1}^{P} g_n(\alpha_p) \cdot \exp\left(j \cdot \left(\Phi_p + 2\pi f_p t + \frac{\left(n - \frac{5}{2}\right)d}{\lambda} \sin(\alpha_p)\right)\right) \cdot \delta(\tau - \tau_0) \qquad (28)$$

wherein $g_n(\alpha)$ is the antenna-specific complex azimuth radiation pattern of each Tx antenna.

If a channel has no angular spread, and all path-specific angles $\alpha_p$ are equal to $\bar{\alpha}$, the channel impulse response for each Tx antenna is given as $$h_n(t) = g_n(\bar{\alpha}) \cdot \exp\left(j \cdot \frac{\left(n - \frac{5}{2}\right)d}{\lambda} \sin(\bar{\alpha})\right) \cdot \frac{1}{\sqrt{P}} \sum_{p=1}^{P} \exp(j \cdot (\Phi_p + 2\pi f_p t)) \cdot \delta(\tau - \tau_0) \qquad (29)$$

-continued $$= g_n(\overline{\alpha}) \cdot \exp\left(j \cdot \frac{\left(n-\frac{5}{2}\right)d}{\lambda} \sin(\overline{\alpha})\right) \cdot h(t)$$

where h(t) is the equivalent channel impulse response for an equivalent isotropic Tx antenna at the reference point.

In this case the channel impulse responses for the different Tx antennas only differ by a complex factor, i.e., the channels are completely correlated. The steering vector is then defined as $$\vec{a}(\overline{\alpha}) = \begin{pmatrix} g_1(\overline{\alpha}) \cdot \exp\left(j \cdot \frac{-3d}{2\lambda} \sin(\overline{\alpha})\right) \\ g_2(\overline{\alpha}) \cdot \exp\left(j \cdot \frac{-d}{2\lambda} \sin(\overline{\alpha})\right) \\ g_3(\overline{\alpha}) \cdot \exp\left(j \cdot \frac{d}{2\lambda} \sin(\overline{\alpha})\right) \\ g_4(\overline{\alpha}) \cdot \exp\left(j \cdot \frac{3d}{2\lambda} \sin(\overline{\alpha})\right) \end{pmatrix}, \quad (30)$$

and the channel impulse response vector as $$\vec{h}(t) = \begin{pmatrix} h_1(t) \\ h_2(t) \\ h_3(t) \\ h_4(t) \end{pmatrix}. \quad (31)$$

The four (4) channel impulse responses seen from the Tx antennas are then copies of the channel impulse response h(t), weighted by four different complex factors, which means, the vector $\vec{h}(t)$ is a linear transformation of the scalar h(t) given by $$\vec{h}(t) = \vec{a}(\overline{\alpha}) \cdot h(t), \quad (32)$$

i.e., the vector $\vec{g}$ in the linear transformation of (19) is in this example equal to the scalar h(t) and the matrix B is equal to the vector $\vec{a}(\overline{\alpha})$. This means the channel covariance matrix $R_h = \langle \vec{h} \cdot \vec{h}^H \rangle$ is equal to $R_h = \vec{a}(\overline{\alpha}) \vec{a}(\overline{\alpha})^H \langle |h(t)|^2 \rangle$ in this example. If the steering vector $\vec{a}(\overline{\alpha})$ is known, such as a-priori knowledge of the antenna configuration and the radio path direction $\overline{\alpha}$, it is sufficient to estimate the scalar h(t) and either calculate an estimate for $\vec{h}(t)$ using the linear transformation with $\vec{a}(\overline{\alpha})$ or use the estimate of h(t) and $\vec{a}(\overline{\alpha})$ directly for demodulation.

Note that for the case when $\vec{a}(\overline{\alpha})$ is known it may be sufficient to estimate h(t) and then compute an estimate of $\vec{h}(t)$ from the scalar estimate of h(t). If the demodulator is designed such that the channel consists of a single scalar, i.e., the demodulation considers $\vec{a}(\overline{\alpha})$, then it is possible to demodulate using $\vec{a}(\overline{\alpha})$ and the scalar channel.

The antenna-specific pilot signals at the transmitter are termed $x_n(t)$, $n=1 \ldots N_{Tx}$, and the relationship is defined by $$|x_n(t)|^2 = 1 \; \forall \; n \in \{1 \ldots N_{Tx}\}. \quad (33)$$

The pilot signals are made up of segments, each having a duration $T_S$, referred to as the pilot symbol duration, over which the pilot signals are orthogonal, and wherein the following holds $$\int_{(n-1)T_S}^{nT_S} x_i^*(t) \cdot x_j(t) dt = 0 \; \forall \; i, j \in \{1 \ldots N_{Tx}\} \; i \neq j. \quad (34)$$

The pilot vector is defined as $$\vec{x}(t) = \begin{pmatrix} x_1(t) \\ x_2(t) \\ x_3(t) \\ x_4(t) \end{pmatrix}, \quad (35)$$

and the receiver noise signal z(t) represents white Gaussian noise. The signal received by the single Rx antenna is described as $$y(t) = \vec{x}^T(t) \cdot \vec{h}(t) + z(t). \quad (36)$$

Conventionally, correlating the received signal with the four (4) pilot sequences derives a set of four (4) channel estimates. Wherein the pilot signals are orthogonal over a pilot symbol period, this estimation is then repeated at the pilot symbol rate. Such a correlation procedure is generally referred to as "integrate and dump" and may be expressed as $$\hat{\vec{h}}_{conv}^{(n)} = \frac{1}{T_S} \cdot \int_{(n-1)T_S}^{nT_S} \vec{x}^*(t) \cdot y(t) dt \quad (37)$$

wherein $\hat{\vec{h}}_{conv}^{(n)}$ is a vector made up of conventional, i.e., integrate and dump, channel estimates derived from the n-th pilot symbol. If (34) is transformed into a discrete time representation, by putting $N_T = T_S/T$ samples of the pilot signals $x_n(t)$ into the columns of the matrix A, NT samples of the noise signal z(t) into the vector $\vec{n}$, and $N_T$ samples of the received signal y(t) into the vector $\vec{r}$, (34) yields $$\vec{r} = A \cdot \vec{h}(t) + \vec{n}. \quad (38)$$

Then the discrete time representation of (37) is $$\hat{\vec{h}}_{conv}^{(n)} = \frac{1}{N_T} A^H \cdot \vec{r}. \quad (39)$$

If the channel variations within one pilot symbol are neglected, (39) becomes $$\hat{\vec{h}}_{conv}^{(n)} = \vec{h}(nT_s) + \frac{1}{N_T} \cdot A^H \cdot \vec{n}. \quad (40)$$

Considering the linear transformation of h(t) into h(t), the received signal is expressed as $$\vec{r} = A \cdot \vec{a}(\overline{\alpha}) h(t) + \vec{n}. \quad (41)$$

From this, an estimate of the scalar h(t) is derived as $$\hat{h}^{(n)} = \frac{\vec{a}^{*T}(\overline{\alpha})}{\|\vec{a}(\overline{\alpha})\|^2} \cdot \hat{\vec{h}}_{conv}^{(n)}. \qquad (42)$$

Again, when the channel variations within one pilot symbol are ignored, (13) becomes $$\hat{h}^{(n)} = h(nT_s) + \frac{\vec{a}^{*T}(\overline{\alpha})}{N_T \cdot \|\vec{a}(\overline{\alpha})\|^2} \cdot A^H \cdot \vec{n}. \qquad (43)$$

From this scalar estimate, using the linear transformation, a new estimate of the channel impulse vector is generated as $$\hat{\vec{h}}_{new}^{(n)} = \vec{a}(\overline{\alpha}) \cdot \hat{h}^{(n)} = \frac{\vec{a}(\overline{\alpha}) \cdot \vec{a}^{*T}(\overline{\alpha})}{\|\vec{a}(\overline{\alpha})\|^2} \cdot \hat{\vec{h}}_{conv}^{(n)}. \qquad (44)$$

Ignoring channel variations within one pilot symbol, (44) becomes $$\hat{\vec{h}}_{new}^{(n)} = \vec{h}(nT_s) + \frac{\vec{a}(\overline{\alpha}) \cdot \vec{a}^{*T}(\overline{\alpha})}{N_T \cdot \|\vec{a}(\overline{\alpha})\|^2} \cdot A^H \cdot \vec{n}. \qquad (45)$$

If $\vec{a}(\overline{\alpha})$ is not known a-priori, it may be estimated using the covariance matrix given by $$R_h = \langle \vec{h}(nT_s) \cdot \vec{h}^{*T}(nT_s) \rangle = \vec{a}(\overline{\alpha}) \cdot \vec{a}^{*T}(\overline{\alpha}) \cdot P_h, \qquad (46)$$

with $P_h$ being the average power of the scalar channel impulse response h(t). The covariance matrix $R_h$ can be approximated as $$\hat{R}_h = \frac{1}{N_{sym}} \sum_{n=1}^{N_{sym}} \hat{\vec{h}}_{conv}^{(n)} \cdot \hat{\vec{h}}_{conv}^{(n)H}, \qquad (47)$$

which averages the vector with the conventional channel impulse response estimates over a number, $N_{sym}$, of pilot symbols.

For the case without noise and having an angular spread equal to zero, $\hat{R}_h$ is rank one (1) and the vector $\vec{a}(\overline{\alpha})$ spans $\hat{R}_h$. Thus (47) reduces to $$\hat{R}_h|_{noiseless} = R_a = \frac{\vec{a}(\overline{\alpha}) \cdot \vec{a}^{*T}(\overline{\alpha})}{\|\vec{a}(\overline{\alpha})\|^2}. \qquad (48)$$

Note that the normalized vector $\vec{a}(\overline{\alpha})/\|\vec{a}(\overline{\alpha})\|$ spans $R_a$.

For a noisy case with sufficient low noise power and sufficient low angular spread, $\hat{R}_h$ is still dominated by one eigenvalue. Therefore, the process performs an eigenvalue decomposition of $\overline{R}_h$. When one eigenvalue is much larger than all other eigenvalues, it is an indication that the angular spread around $\vec{a}(\overline{\alpha})$ was rather small. Therefore, as $\vec{v}_{max}$ is the eigenvector corresponding to the largest eigenvalue of $\hat{R}_h$, the approximation becomes $$R_a = \frac{\vec{a}(\overline{\alpha}) \cdot \vec{a}^{*T}(\overline{\alpha})}{\|\vec{a}(\overline{\alpha})\|^2} \approx \vec{v}_{max} \cdot \vec{v}_{max}^{*T}. \qquad (49)$$

Note that the vector $\vec{v}_{max}$ in this example is equal to the channel subspace $E_C$. In general, the estimate $\hat{R}_h$ is used to determine whether the rank of the channel estimation covariance matrix can be reduced. If $\hat{R}_h$ is full rank, the channel estimation problem is not reduced to a smaller dimension.

According to the exemplary embodiment, orthogonal pilot signals of binary chips have a chip rate of 1.2288 Mcps, and a pilot symbol duration of 64 chips. With this channel model, a received signal, including white Gaussian noise, is generated for 4000 consecutive pilot symbols having a pilot Signal-to-Noise Ratio (SNR). From the received signal, 4000 conventional vector estimates, $\hat{\vec{h}}_{conv}^{(n)}$, are generated.

The thus generated covariance matrix $\vec{R}_h$ is averaged over these 4000 consecutive conventional channel estimates. In the exemplary embodiment, the process takes approximately 208.3 ms. After extracting the eigenvector corresponding to the maximal eigenvalue of $\hat{R}_h$, the matrix $R_a$ is calculated. Subsequently, 4000 new vector estimates $\hat{\vec{h}}_{new}^{(n)}$ are produced according to $$\hat{\vec{h}}_{new}^{(n)} = R_a \cdot \hat{\vec{h}}_{conv}^{(n)}. \qquad (50)$$

Using the exemplary embodiment, iterations are repeated $N_{exp}=50$ times. Over the 50 iterations the transmitter angles are varied such that $\overline{\alpha}$ is uniformly distributed within (+/− 60) degrees, while the angular spread remains constant, having a standard deviation of square root of two ($\sqrt{2}$) degrees. Additionally, the channel parameters for a given pilot SNR are varied. The varied parameters represent radio path direction(s), path-specific phase, and path-specific Doppler shift, for a certain pilot SNR. An equal number of iterations is performed for different pilot SNR values. A comparison of the quality of the set of conventional estimates to the set of new vector estimates, with respect to the reduction factor of the mean squared estimation error that is averaged over time and iterations, is made using the estimation gain given as $$g = \frac{\langle \|\hat{\vec{h}}_{conv} - \vec{h}\|^2 \rangle}{\langle \|\hat{\vec{h}}_{new} - \vec{h}\|^2 \rangle}. \qquad (51)$$

Figure 6:
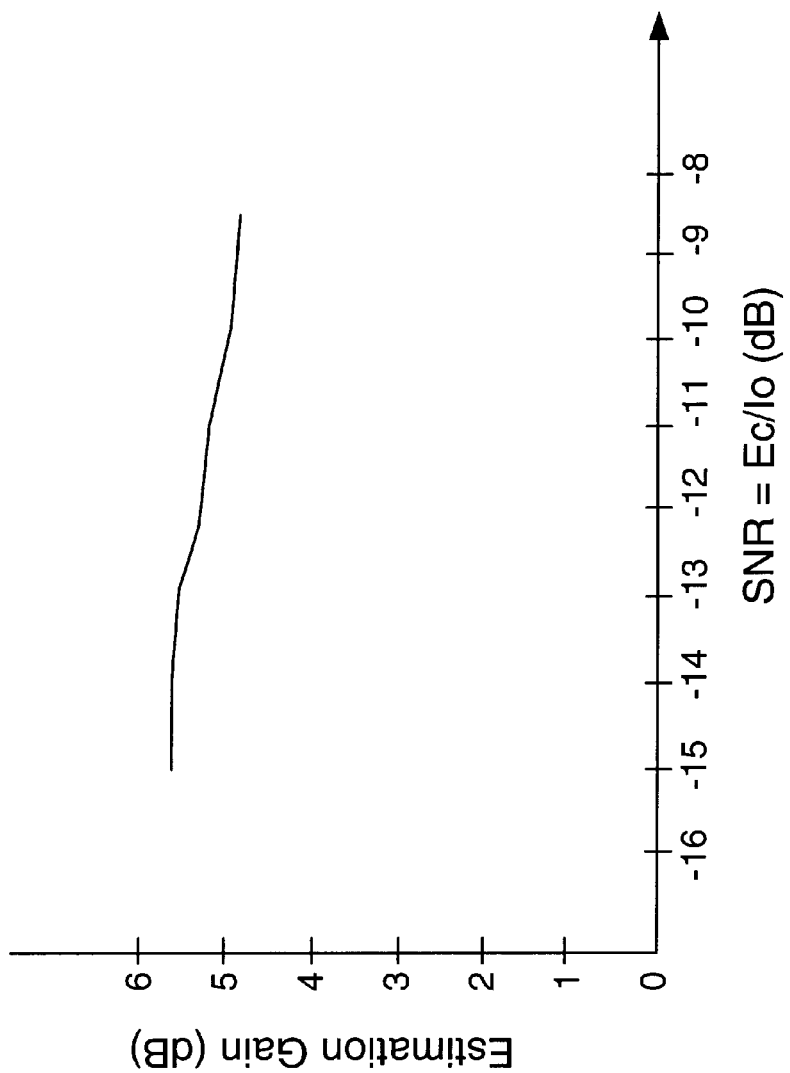
FIG. 6 illustrates a plot of the estimation gain of one embodiment.

For the exemplary embodiment, FIG. 6 illustrates the estimation gain in dB as a function of the pilot SNR. Wherein the pilot SNR is defined as the ratio of the average energy per pilot chip $E_C$ of one pilot signal received at the single antenna receiver to the received noise power density $I_O$ in dB.

The upper limit for the estimation gain is determined by the number of transmit antennas, which is illustrated in FIG. 6 as 6 dB. As illustrated in FIG. 6, the estimation gain approaches the upper limit even though the assumed angular spread is not zero and the received signal is severely corrupted by noise. The reduction of the estimation gain with increasing pilot SNR is due to the non-zero angular spread.

Although the channel impulse responses are not completely correlated, the derivation of the impulse response $\vec{h}_{new}$, assumes this property. For larger angular spreads, a smaller estimation gain is expected. For small angular spreads, the estimation gain appears considerable. Note that in general, for residential and suburban environments, a standard deviation of one (1) to two (2) degrees is frequently observed. Note also that it is possible to evaluate the performance improvement of the reduced rank channel estimation method using a Monte-Carlo-simulation to derive the reduction of estimation errors of the channel impulse responses as compared to conventional channel estimation using independent correlators.

Reduced rank channel estimation for systems using multiple transmitter antennas allows improvement of the channel estimation quality under certain propagation conditions with limited diversity due to correlated fading. As the mechanisms affecting correlation, such as the directionality of the radio wave propagation, change relatively slowly over time, the correlation characteristics may be estimated by averaging over extended time intervals. This is in contrast to the time intervals associated with inverse fading rate of the channel and thus allows improved accuracy in estimating the correlation characteristics.

Reduced rank channel estimation for multiple transmitter antennas is also applicable to frequency-selective channels by computing either separate estimates of the correlation characteristics or by computing estimates of the correlation characteristics across all propagation delays. Separate estimates refers to computation of $\hat{R}_h$, for each propagation delay. Reduced rank channel estimation is then performed taking into account each delay occurring in the frequency-selective channel impulse response. In an alternate embodiment, wherein additional information, such as the antenna configuration at the transmitter, is known a-priori, the step of estimating the linear transformation of the reduced number of uncorrelated channels into the larger number of correlated channels may be more accurate. Additionally, the reduced rank estimation process may be extended to cases with more than one receiver antenna. In this case, the estimation is performed for the MIMO channels, as illustrated in FIG. 1. While the present example involves a system employing coherent demodulation, reduced rank channel estimation as described herein is also applicable to communication systems employing non-coherent demodulation.

Figure 7:
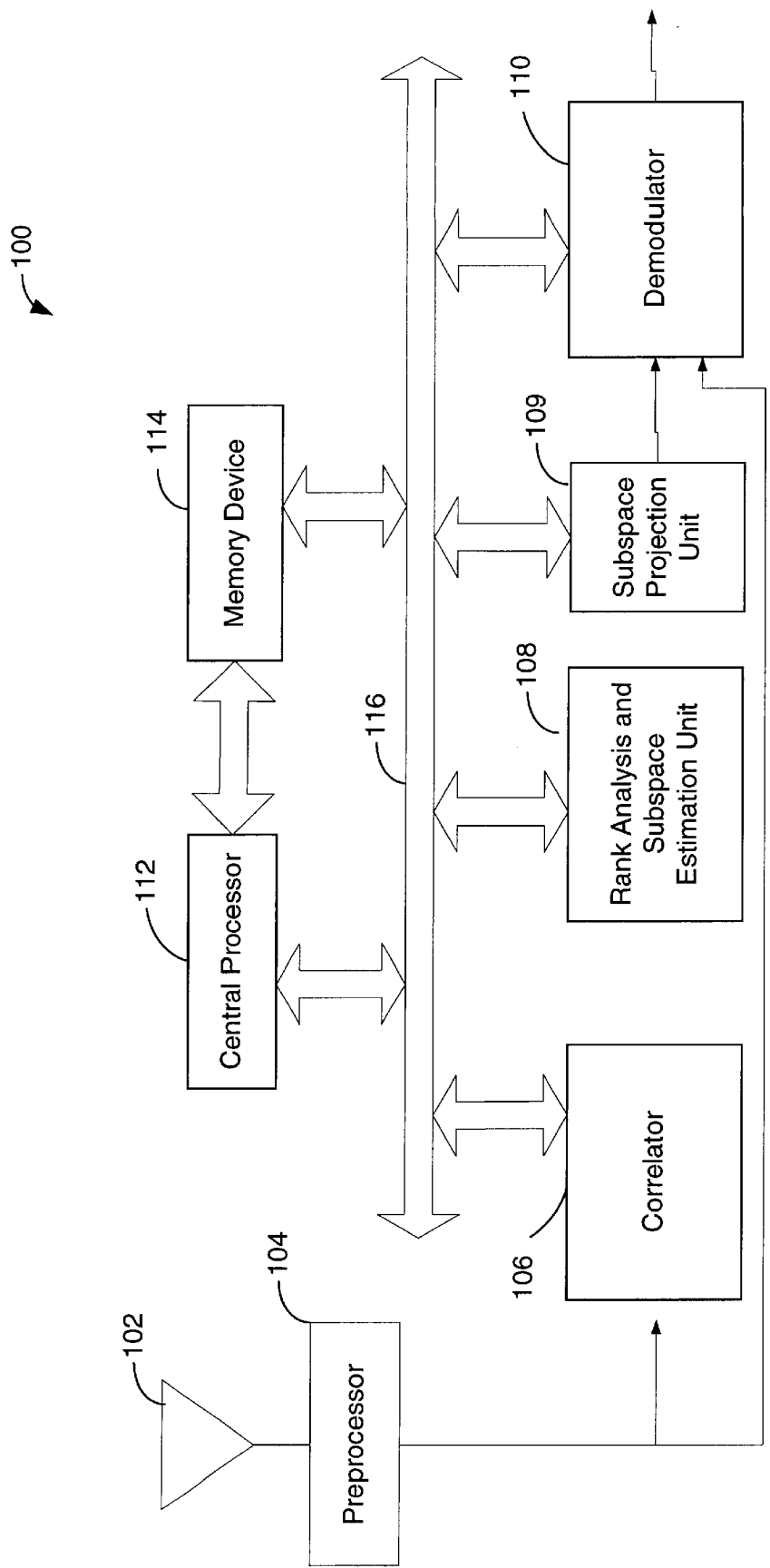
FIG. 7 illustrates a system configuration according to one embodiment.

A receiver 100 according to one embodiment of the present invention is illustrated in FIG. 7. The receiver 100 has a single antenna 102 that receives signals from a transmitter having multiple antennas. The received signals are first processed by the preprocessor 104. The signals are then provided to a correlator 106, which is used as a sliding correlator for searching and as a correlator for the significant delays for channel estimation. In an alternate embodiment the delays are determined in software without use of a correlator. The outputs of the correlator 106 are used to provide an estimate of the covariance matrix. In one embodiment, the correlator 106 is made up of fingers to form a rake, having one finger for each combination of transmitter antenna, receiver antenna and significant delay. The estimates are provided to the central processor 112 via bus 116. The processor 112 stores the channel parameter estimates in memory 114 so that the estimates may be used to derive the channel covariance matrix averaged over time.

From memory 114, the estimated covariance matrix is provided to the rank analysis and subspace estimation unit 108 for eigenvalue decomposition. If one or more eigenvalues dominate the others, the channel subspace is estimated by computing the eigenvectors that correspond to the dominant eigenvalues. The eigenvectors spanning the channel subspace are written to memory for further use in the channel subspace projection unit 109 where reduced rank channel parameter estimates are produced by computing the projection of the $(N_{Tx} \cdot N_{Rx} \cdot N_E)$ original channel estimates per estimation time interval onto the channel subspace, yielding $N_{Ch}$ reduced rank channel parameter estimates per estimation time interval. The results of the channel subspace projection unit 109 are written to memory for use in the demodulator 110. Optionally the channel subspace projection unit 109 could generate equivalent full dimension channel parameter estimates, by re-transforming the $N_{Ch}$ reduced rank channel parameter estimates into $(N_{Tx} \cdot N_{Rx} \cdot N_E)$ equivalent full dimension channel parameter estimates per estimation time interval. For example in a conventional RAKE-receiver design for the full rank channel model, the number of rake fingers for a full rank demodulator would be $(N_{Tx} \cdot N_{Rx} \cdot N_E)$. A full rank demodulator would then use the $(N_{Tx} \cdot N_{Rx} \cdot N_E)$ original channel parameter estimates for the finger coefficients. A reduced complexity demodulator could eventually use only $N_{Ch}$ RAKE fingers using the $N_{Ch}$ reduced rank channel estimates as coefficients. However, since the receiver would generally be designed in anticipation of a worst case situation, i.e., wherein $(N_{Tx} \cdot N_{Rx} \cdot N_E)$ fingers are implemented, it would be sufficient to compute $(N_{Tx} \cdot N_{Rx} \cdot N_E)$ correlated channel parameter estimates with improved estimation quality over of the $N_{Ch}$ reduced rank channel parameter estimates.

The rank analysis and subspace estimation unit 108 and the subspace projection unit 109 may be implemented in a Digital Signal Processor (DSP), dedicated hardware, software, firmware, or a combination thereof. Modules within receiver 100 may be incorporated together, and are illustrated as separate blocks for clarity based on function.

Figure 8:
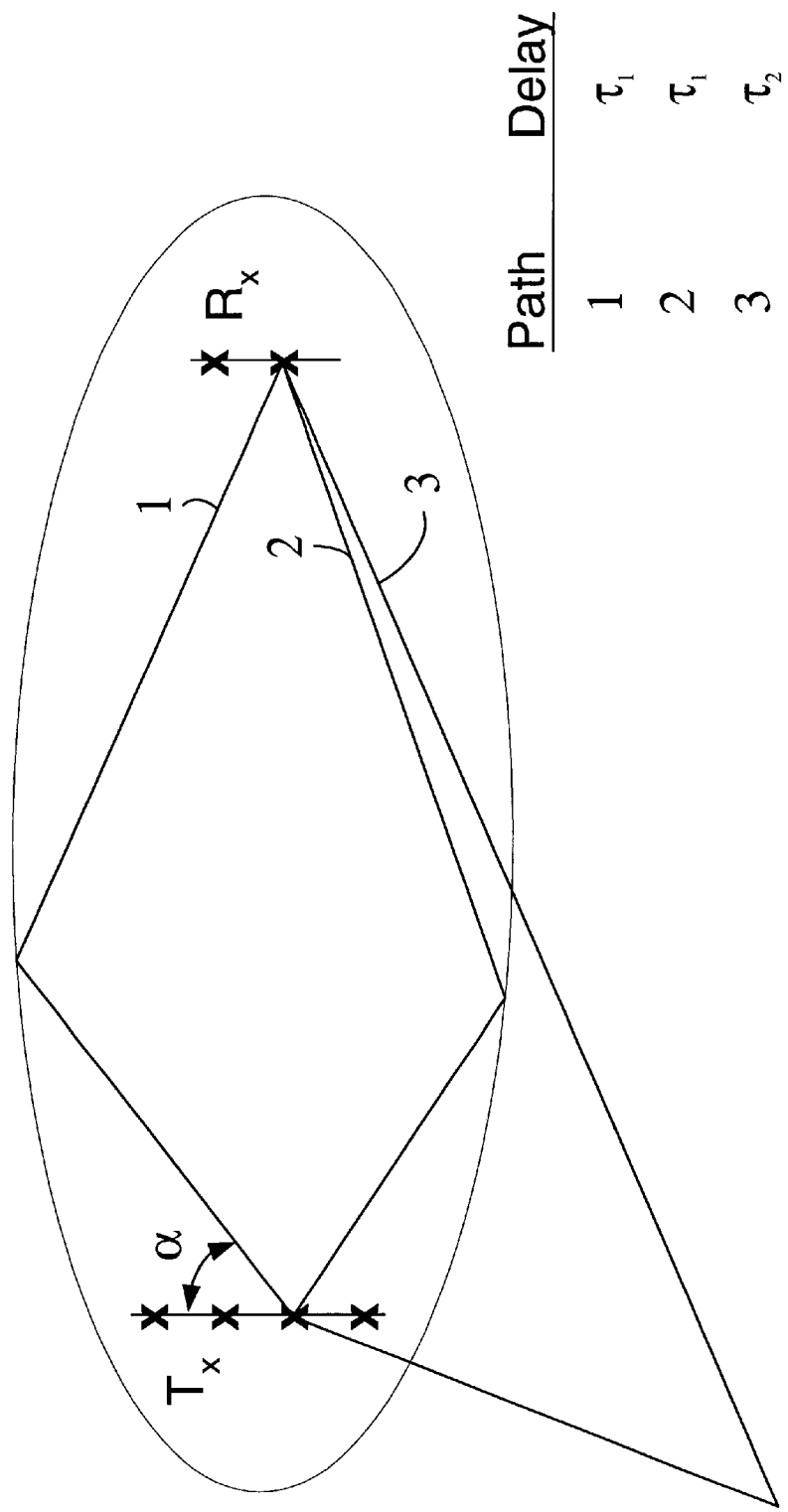
FIG. 8 illustrates an exemplary embodiment of a wireless communication system.

An exemplary configuration of one embodiment is illustrated in FIG. 8 for a system having four (4) transmitter antennas and two (2) receiver antennas. Three (3) transmission paths are illustrated and labeled 1, 2 and 3. The points of reflection for paths 1 and 2 are both on a same ellipse, wherein the ellipse is formed such that Tx and Rx are the focal points. Note that the ellipse is superimposed on the illustration of the physical layout of the system. Path 3 falls outside of the illustrated ellipse. Paths 1 and 2 have the same significant delay, $\tau_1$, with respect to the receiver, while path 3 has a significant delay, $\tau_2$ different from $\tau_1$. The path delay is a function of the configuration of the antennas as well as the environment of the system. As illustrated, the four (4) transmitter antennas and the two (2) receiver antennas result in eight (8) channels. Each of the path delays, $\tau_1$ and $\tau_2$, produce an echo, wherein ($N_E$=2). The dimension of the covariance matrix is given as $(N_{Tx} \cdot N_{Rx} \cdot N_E)$ or sixteen (16) corresponding to the. $(N_{Tx} \cdot N_{Rx} \cdot N_E)$ channel impulse response samples. Therefore, the full rank channel parameter vector is a 16-dimension vector. Using the rank reduction methods described herein, the rank of the channel estimation may be reduced to three (3) dimensions, corresponding to paths 1, 2, and 3, wherein ($N_{Ch}$=2). Note that where the mapping of the $N_{Ch}$ transmission paths to the $(N_{Tx} \cdot N_{Rx} \cdot N_E)$ channel impulse response samples is not known, the subspace may be extracted from configuration information. If the location and characteristics, such as direction and directionality, of the antennas are known, the information may be used to generate an array response or steering vector. Using the steering vector and path direction information, which is also extractable using subspace algorithms, the angle of transmission, $\alpha$, is estimated. If the antenna configuration has a fixed deployment the angle of transmission is calculable. A vector is formed including an angle of transmission for each transmitter antenna. Similarly, an arrival angle vector is formed considering the receiver antennas. A linear transformation for the mapping of the $N_{Ch}$ transmission paths to the ($N_{Tx} \cdot N_{Rx} \cdot N_E$) channel impulse response samples is constructed using this information from both the transmitter and receiver configurations. This provides the matrix B as given in (19) hereinabove describing the linear transformation. The covariance matrix is derived therefrom as in (20) hereinabove. The process then proceeds as for the case where corresponding information is obtained from a priori knowledge.

While one embodiment has been described herein with respect to the time domain, an alternate embodiment performs a rank reduction of the covariance matrix or a sample matrix in the frequency domain. If the parameters and equations are developed in the frequency domain, the process to estimate the channel then incorporates the frequency domain values.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A wireless communication apparatus, comprising:
    a correlator operative to estimate a covariance matrix representing a link with a transmitter based on signals received from the transmitter;
    a rank analysis unit coupled to the correlator and operative to estimate a rank of the covariance matrix; and
    a channel estimation unit coupled to the rank analysis unit and operative to generate a reduced rank channel estimate.

2. The apparatus of claim 1, wherein the covariance matrix represents a plurality of impulse responses between the apparatus and the transmitter.

3. The apparatus of claim 1, wherein the correlator is operative to determine a correlation of at least two channels.

4. The apparatus of claim 3, wherein the rank analysis unit is operative to determine an eigenvalue corresponding to the covariance matrix.

5. The apparatus of claim 4, wherein the rank analysis unit is operative to compare the estimated rank of the covariance matrix to a predetermined full value.

6. A wireless communication apparatus, comprising:
    a correlator means operative to estimate a covariance matrix representing a link with a transmitter based on signals received from the transmitter;
    a rank analysis means coupled to the correlator means and operative to estimate the rank of the covariance matrix; and
    a channel estimation means coupled to the rank analysis means and operative to generate a reduced rank channel estimate.

7. A method in a wireless communication system, comprising:
    estimating a covariance matrix representing a link with a transmitter based on signals received from the transmitter;
    estimating a rank of the covariance matrix; and
    generating a reduced rank channel estimate.

8. An apparatus as in claim 1, wherein the correlator is operative to estimate delays in signals received.

9. An apparatus as in claim 1, wherein the rank analysis unit is operative to compare the rank of the covariance matrix to a maximum rank.

10. An apparatus as in claim 9, wherein if the rank of the covariance matrix is less than the maximum rank, the channel estimation means is operative to generate a full rank channel estimate.

11. A method as in claim 3, further comprising:
    determining if the rank of the covariance matrix is less than a maximum rank; and
    if the rank is less then N×M performing an extraction of a subspace of the matrix.

12. A method as in claim 11, wherein estimating a covariance matrix comprises:
    determining a matrix describing parametric relations of the link.

13. A method as in claim 12, further comprising:
    deriving channel impulse responses for each channel based on the extracted subspace of the matrix; and
    demodulating a received signal using the channel impulse responses.

14. A wireless communication apparatus, comprising:
    means for estimating a covariance matrix representing a link with a transmitter based on signals received from the transmitter;
    means for estimating a rank of the covariance matrix; and
    means for generating a reduced rank channel estimate.

15. A wireless communication apparatus as in claim 14, further comprising:
    means for determining if the rank of the covariance matrix is less than a maximum rank; and
    means for performing an extraction of a subspace of the matrix if the rank is less then the maximum rank.

16. A wireless communication apparatus as in claim 15, wherein the means for estimating a covariance matrix comprises:
    means for determining a matrix describing parametric relations of the link.

17. A wireless communication apparatus as in claim 16, further comprising:
    means for deriving channel impulse responses for each channel based on the extracted subspace of the matrix; and
    means for demodulating a received signal using the channel impulse responses.

* * * * *